(12) United States Patent
Kawasaki et al.

(10) Patent No.: US 6,615,609 B2
(45) Date of Patent: Sep. 9, 2003

(54) ACCUMULATOR

(75) Inventors: Haruo Kawasaki, Tsukuba (JP); Shin'ichi Toyama, Tsukuba (JP)

(73) Assignee: National Space Development Agency of Japan, Tsukuba (JP)

( * ) Notice: Subject to any disclaimer, the term of this patent is extended or adjusted under 35 U.S.C. 154(b) by 0 days.

(21) Appl. No.: 10/084,053

(22) Filed: Feb. 28, 2002

(65) Prior Publication Data

US 2003/0145622 A1 Aug. 7, 2003

(30) Foreign Application Priority Data

Feb. 5, 2002 (JP) .................................... 2002-027676

(51) Int. Cl.$^7$ ................................................ F25B 43/00

(52) U.S. Cl. .................................... 62/503; 62/512

(58) Field of Search .......................... 62/503, 512, 474, 62/468; 210/283, 284, 285

(56) References Cited

PUBLICATIONS

Buchko, M., *Test Results of Prototype Two–Phase Reservoirs for the CAPL Flight Experiment*, AIAA 27$^{th}$ Thermophysics Conference, Jul. 6–8, 1992, Nashville, TN.

*Primary Examiner*—Chen Wen Jiang
(74) *Attorney, Agent, or Firm*—Jacobson Holman PLLC (57) ABSTRACT

The present invention provides an accumulator 21 for evaporating and condensing a refrigerant in a pressure vessel 22 thereof to control pressure or the like in a closed-loop type controlled unit. The accumulator comprises liquid-phase refrigerant holding means 23 for holding the refrigerant in liquid phase, heating means 25 for heating and evaporating the refrigerant in liquid-phase, cooling means 24 for cooling and condensing the refrigerant in vapor-phase, and a connection port 28 in fluid communication with the controlled unit. The liquid-phase refrigerant holding means 23 includes a vane 32 made of a material capable of absorbing the refrigerant in liquid phase, and the end 35 of the vane 32 has a shape in contact with the inner surface of the pressure vessel 22. The accumulator is adapted to heat or cool the pressure vessel 22 by the heating means 25 or the cooling means 24 to evaporate or condense the refrigerant in the pressure vessel 22 so as to control pressure or refrigerant amount in the controlled unit.

7 Claims, 7 Drawing Sheets

ACCUMULATOR

FIELD OF THE INVENTION

The present invention relates to an accumulator for evaporating and condensing a refrigerant in a pressure vessel thereof to control pressure or the amount of refrigerant in a closed loop type controlled unit.

BACKGROUND OF THE INVENTION

As compared to use conditions on the ground, electronic devices equipped for a spacecraft, such as a space station or a space satellite, are used under more severe thermal environment. For this reason, such spacecraft electronic devices are typically cooled by a radiator system to keep their temperature in the allowable range. Heretofore, various techniques including a heat pipe have been used as the radiator system. For example, the radiator system suitable for a large-scaled spacecraft includes a two-phase flow loop radiator system based on evaporation and condensation of refrigerant.

Figure 8:
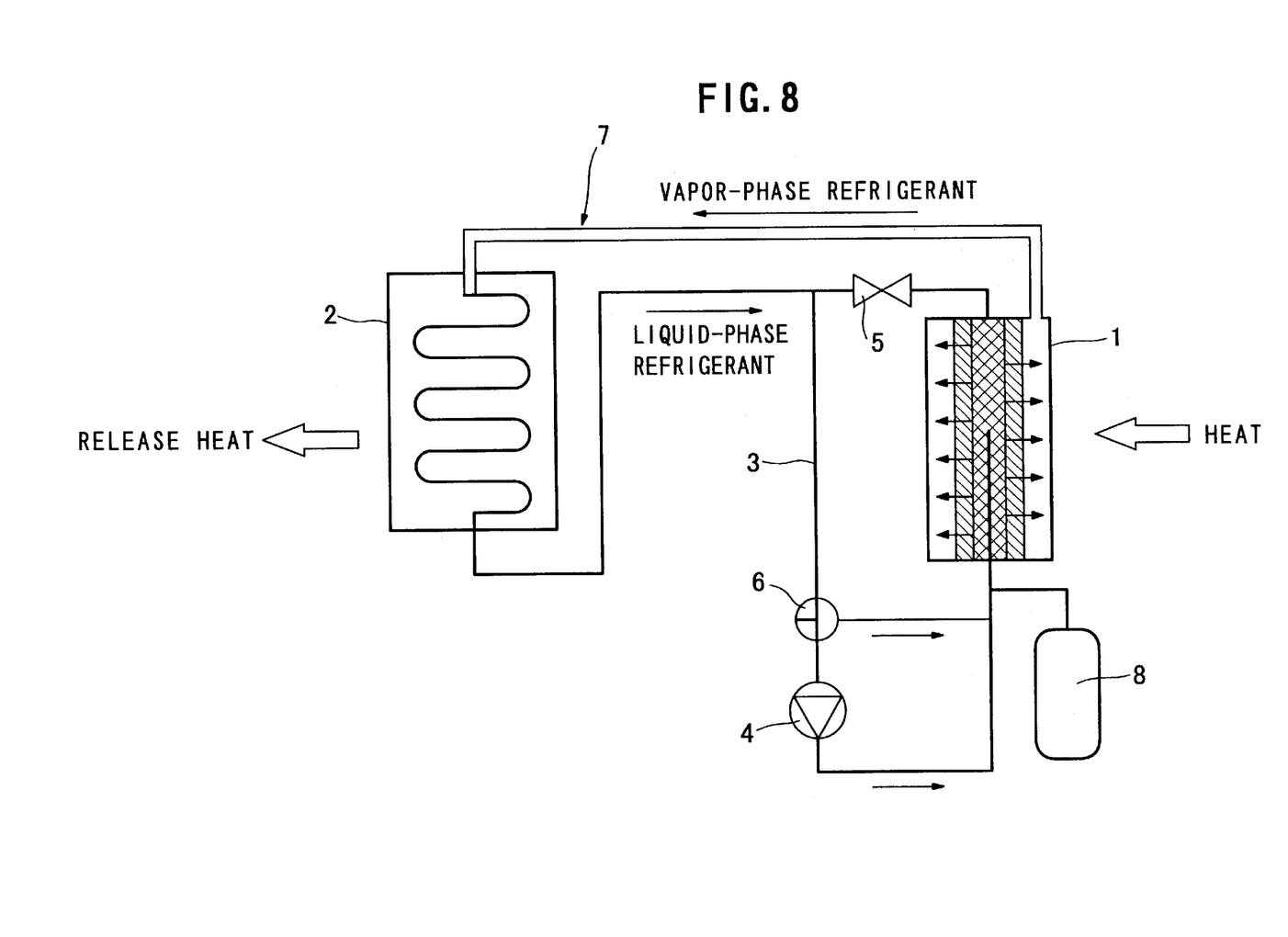
FIG. 8 is a schematic block diagram showing a conventional two-phase flow loop radiator system.

As shown in FIG. 8, this two-phase flow loop radiator system comprises: a closed loop type controlled unit 7 including an evaporator 1 disposed in a spacecraft, a condenser 2 disposed on the side of outer space, a piping 3 for providing fluid communication between them, a pump 4 and valves 5, 6 interposed in the piping 3. Further, an accumulator 8 is connected with the downstream side of the evaporator 1.

Figure 9:
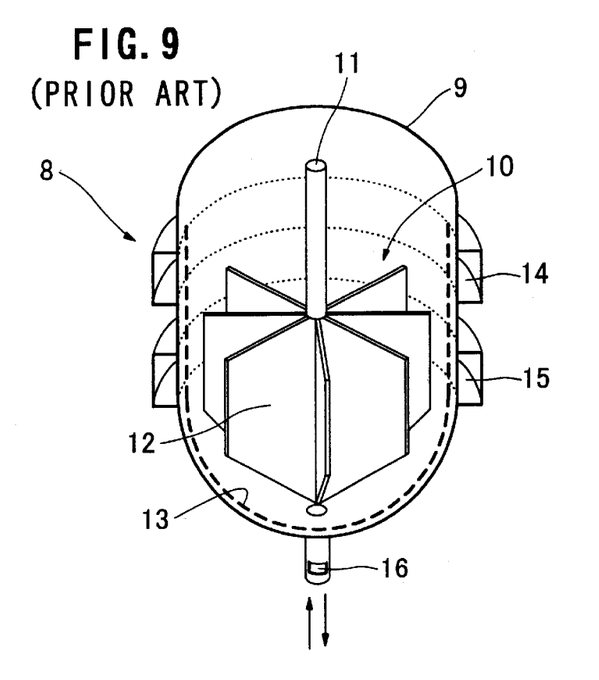
FIG. 9 is a perspective view showing a conventional accumulator.

FIG. 9 shows a conventional example of the accumulator 8 which is provided with a liquid-phase refrigerant holding member 10 in a pressure vessel 9 thereof. The liquid-phase refrigerant holding member 10 comprises a plurality of flat-plate-shaped vanes 12 (eight vanes in FIG. 9) each extending radially about a center shaft 11, and a wick 13 provided along the inner wall of the pressure vessel 9 to surround the vanes 12. Further, a heater 14 and a cooler 15 are provided on the outer peripheral wall of the pressure vessel 9 to surround the outer peripheral wall at their vertically separated positions. Further, a connection port 16 is provided at the central portion of the lower end of the pressure vessel 9. The connection port 16 is in fluid communication with the controlled unit 7.

For activating the two-phase flow loop radiator system, in advance, the controlled unit 7 is filled with a refrigerant, and the liquid-phase refrigerant excessively supplied to the controlled unit 7 is collected and stored in the accumulator 8. In this state, upon activating the two-phase flow loop radiator system, the liquid-phase refrigerant in the evaporator 1 absorbs heat generated by electronic devices. Thus, the refrigerant is evaporated and vaporized, and is then transferred to the condenser 2 through the piping 3. The heat of the vapor-phase refrigerant transferred to the condenser 2 is released to outer space through the condenser 2. Thus, the refrigerant is condensed and liquefied again, and is then returned to the evaporator 1 through the piping 3, valve 6 and pump 4. Subsequently, the same cycle is repeated during the operation of the two-phase flow loop radiator system. During these cycles, the heater 14 or the cooler 15 of the accumulator is controlled in response to variance in heat load from the electronic devices of the spacecraft to evaporate or condense the refrigerant in the pressure vessel 9. For example, when the vanes 12 and the wick 13 are heated by the heater 14, the liquid-phase refrigerant held therein is evaporated. Thus, the pressure in the pressure vessel 9 is increased, and thereby the pressure in the controlled unit 7 is increased. When the vapor-phase refrigerant in the pressure vessel 9 is cooled by the cooler 15, the vapor-phase refrigerant is condensed, and the condensed refrigerant is absorbed by the vanes 12 or the wick 13. Then, the liquid-phase refrigerant flows into the controlled unit 7 through the connection port 16. In this manner, the pressure and the refrigerant amount in the controlled unit 7 is varied by changing the pressure and the liquid-phase refrigerant amount in the accumulator 8, and thereby the cooling capacity of the two-phase flow loop radiator system is controlled to keep the temperature of the electronic devices in the allowable range.

Figure 10:
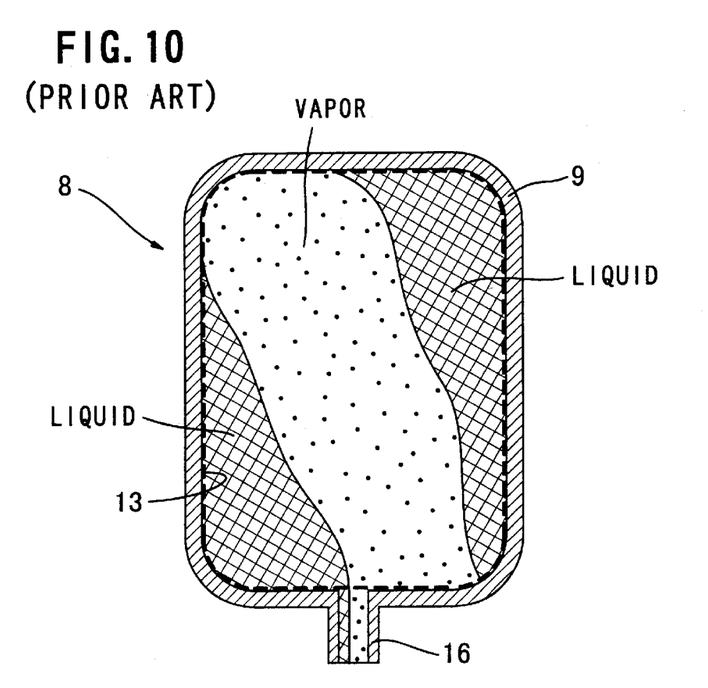
FIG. 10 is a sectional view showing the state when liquid-phase refrigerant is held by the conventional accumulator.

However, in the above conventional accumulator 8, when the pressure vessel 9 is heated under microgravity condition, the vapor-liquid interface of the refrigerant becomes unstable as shown in FIG. 10. Thus, the mixture of vapor-phase and liquid-phase refrigerants can flow from the connection port 16 into the controlled unit 7, resulting in deteriorated controllability of the controlled unit 7.

Further, since the vanes 12 are formed in flat plates, each refrigerant holding capacity of the vanes 12 is low. Thus, in order to hold a desirable amount of refrigerant, it has been required for the vanes 12 to have enlarged holding area or large number of vanes. As a result, the pressure vessel 9 has been undesirably enlarged, and thereby the accumulator 8 has suffered from the difficulty in downsizing and weight reduction.

Further, the liquid-phase refrigerant held by the vanes 12 tends to be concentrated in a narrow region due to surface tension thereof. Thus, most of the liquid-phase refrigerant undesirably is concentrated around the center shaft 11 remote from the cooler 15, resulting in deteriorated thermal controllability during heating or cooling.

SUMMARY OF THE INVENTION

In order to solve the above problems, it is therefore an object of the present invention to provide an improved accumulator capable of achieving desired downsizing and weight reduction with excellent controllability.

According to the present invention, there is provided an accumulator for evaporating and condensing a refrigerant in a pressure vessel thereof to control pressure or the like in a closed-loop type controlled unit, comprises a liquid-phase refrigerant holding element for holding the refrigerant in liquid phase, a heater for heating and evaporating the refrigerant in liquid-phase, a cooler for cooling and condensing the refrigerant in vapor-phase, and a connection port in fluid communication with the controlled unit. The liquid-phase refrigerant holding element includes a vane made of a material capable of absorbing the refrigerant in liquid phase, and the end of the vane has a shape in contact with the inner surface of the pressure vessel.

Preferably, the vane is formed in a wave shape.

The connection port may be disposed between the inner surface of the pressure vessel and the end of the vane.

Further, the connection port may include a slit facing to a space between the inner surface of the pressure vessel and the end of the vane to allow the refrigerant in liquid phase to flow in and out through the slit.

The liquid-phase refrigerant holding element may include a wick provided on the inner surface of the pressure vessel. In this case, the wick is made of a material capable of absorbing the refrigerant in liquid phase.

The wave-shaped vane may be provided in a plural number. In this case, the connection port is provided in the space between each of the plurality of vanes and the inner surface of the pressure vessel.

Further, the plurality of wave-shaped vanes may include a crossing portion therebetween. The crossing portion has a surface smoothly connected to each of the vanes.

In the above structure, when the pressure vessel is cooled by the cooler, the vapor-phase refrigerant in the pressure vessel is condensed and liquefied. The resulting liquid-phase refrigerant is absorbed by the wick or the vane, and then flows into the controlled unit through the space, the slit and connection port. Thus, the refrigerant amount in the controlled unit is increased.

When the pressure vessel is heated by the heater, the liquid-phase refrigerant held by the vane (and the wick) is evaporated and vaporized. Thus, the pressure in the pressure vessel is increased, and thereby the pressure in the controlled unit is increased.

DESCRIPTION OF THE PREFERRED EMBODIMENT

With reference to the drawings, an embodiment of the present invention will now be described.

FIGS. 1 to 4 show an accumulator 21 according to the embodiment of the invention. The accumulator 21 comprises a pressure vessel 22, a liquid-phase refrigerant holding element 23 disposed within the pressure vessel 22, a cooler 24 disposed outside the pressure vessel 22, and a heater 25 disposed outside the pressure vessel 22.

Figure 1:
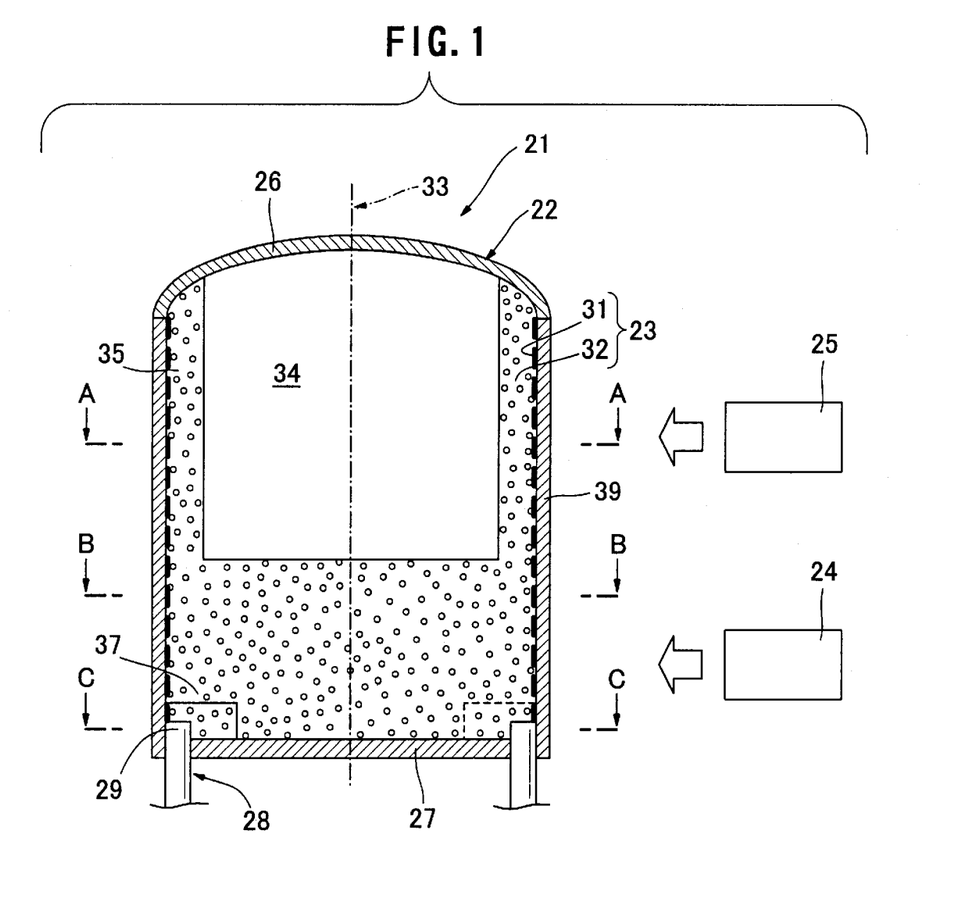
FIG. 1 is a vertical sectional view showing an accumulator according to an embodiment of the present invention.

The pressure vessel 22 is formed in an approximately cylindrical shape. The pressure vessel 22 has a top surface curved quaquaversally and a flat bottom surface. A pair of connection ports 28 are provided at the opposed corners of the bottom surface 27, respectively. Each of the connection ports 28 is in fluid communication with a controlled unit (not shown). The upper end 29 of the connection port 28 is protruded into the pressure vessel 22, and formed in a cylindrical shape having a slit 30 extending vertically.

Figure 2:
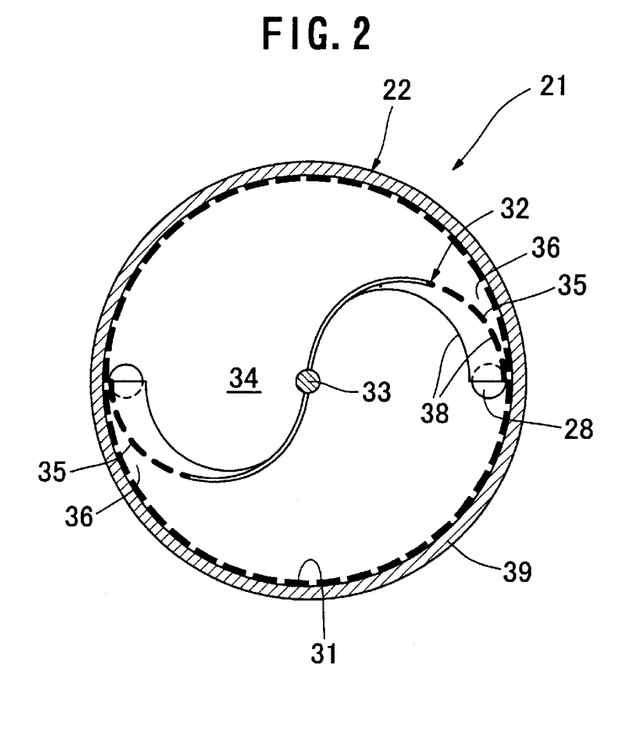
FIG. 2 is a sectional view taken along the line A—A of FIG. 1.
Figure 3:
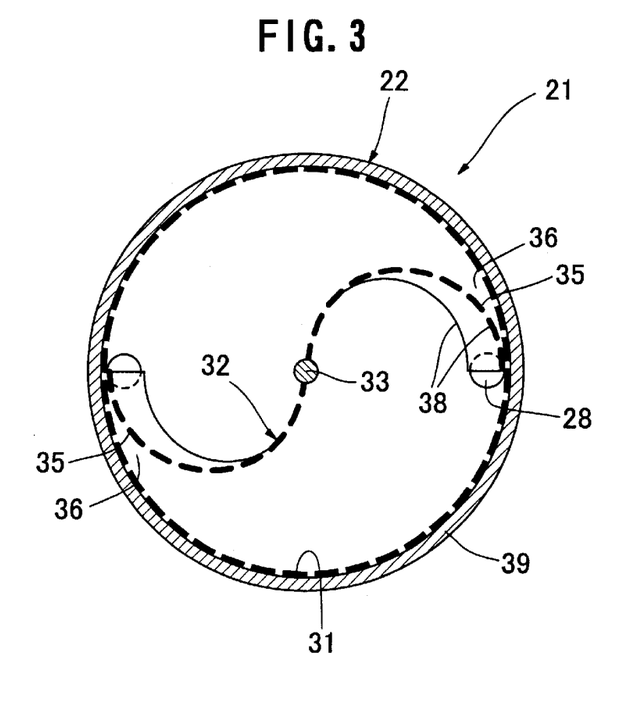
FIG. 3 is a sectional view taken along the line B—B of FIG. 1.
Figure 4:
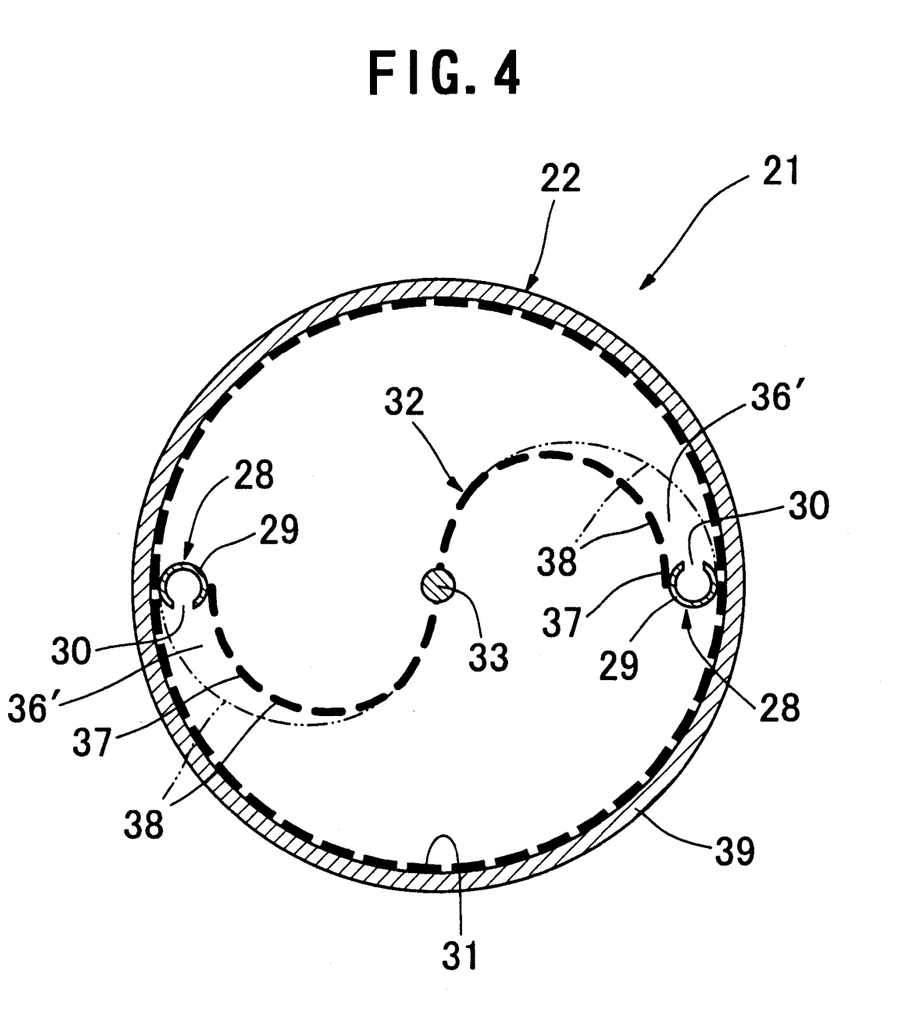
FIG. 4 is a sectional view taken along the line C—C of FIG. 1.

The liquid-phase refrigerant holding element 23 comprises a wick 31 lining the inner surface of the pressure vessel 22, and a vane 32 having a wave shape. Both the wick 31 and vane 32 are made of a porous material. Preferably, the vane 32 is formed in a symmetric shape with respect to a central axis 33, and the upper central portion of the vane 32 is cut away to form a space 34. As shown in FIGS. 2 and 3, the both ends 35 of the vane 32 are brought into contact with the inner surface of the wick 31 to form a narrow space between each of the ends and the wick 31. Further, as shown in FIG. 4, each of the both lower ends 37 of the vane 32 is brought into contact with the outer surface of the upper end 29 of the corresponding connection port 28 at the side of the central axis 33 to form a narrow spaces 36' between each of the lower ends 37 and the wick 31 with facing the slits 30 toward the space 36'.

The cooler 24 is disposed so as to cool the lower portion of the pressure vessel 22, and the heater 25 is disposed so as to heat the upper portion of the pressure vessel 22.

The operation of the accumulator 21 under microgravity condition will be described below.

Figure 7:
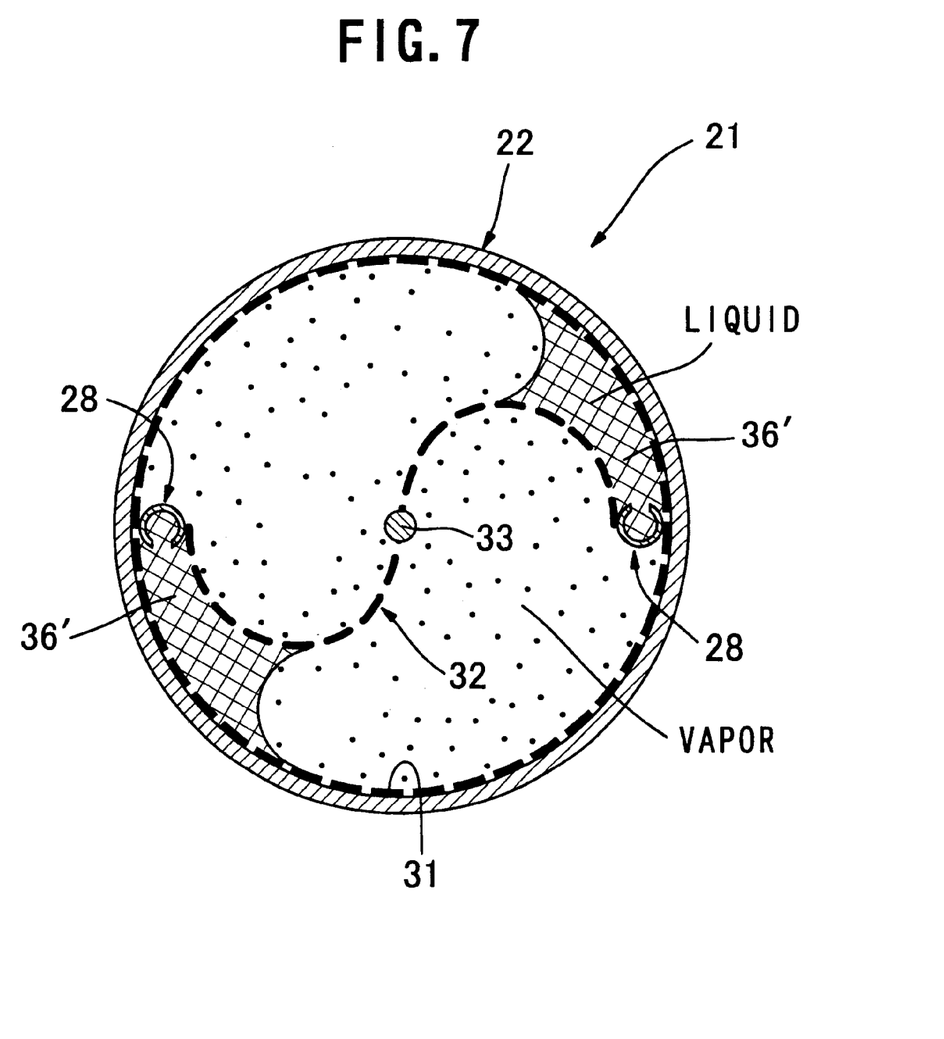
FIG. 7 is a sectional view showing the state when liquid-phase refrigerant is held by the accumulator according to the embodiment of the present invention.

When the lower portion of the pressure vessel 22 is cooled from outside by the cooler 24, the vapor-phase refrigerant in the pressure vessel 22 is condensed, and the resulting liquid-phase refrigerant is absorbed by the wick 31 or the vane 32. Since the liquid-phase refrigerant has the property of moving to a narrow portion due to surface tension thereof, the liquid-phase refrigerant absorbed by the wick 31 and vane 32 is concentrated around the spaces 36 as shown in FIG. 7, and the concentrated liquid-phase refrigerant flows downward to the spaces 36' along the wick 31 and vane 32. Then, the fallen liquid-phase refrigerant enters the connection ports 28 through the slits 30 and flows into the controlled unit. Thus, the amount of the refrigerant in the controlled unit is increased. In this operation, the liquid-phase refrigerant flows smoothly because each of the slits 30 faces toward the corresponding space 36'.

When the upper portion of the pressure vessel 22 is heated from outside by the heater 25, the liquid-phase refrigerant held by the wick 31 and vanes 32 is evaporated. The pressure in the pressure vessel 22 is increased in response to the evaporation of the refrigerant, and thereby the pressure in the controlled unit is increased. In this operation, the liquid-phase refrigerant is concentrated around the spaces 36, 36' on the side of the outer periphery of the pressure vessel in the same manner as described above. Thus, the liquid-phase refrigerant can be held stably even under microgravity condition, and the desirable liquid-phase refrigerant without the vapor-phase refrigerant can be supplied stably to the controlled unit. Further, since each arc-shaped portion 38 of the vane 32 on the side of the ends 35 is located close to the peripheral wall 39 of the pressure vessel 22, the liquid refrigerant gets close to the heater 25. This provides enhance heating efficiency. Further, since the space 34 is formed in the upper portion of the pressure vessel 22, the evaporated vapor-phase refrigerant can be kept in a stable state within the pressure vessel 22.

Figure 5:
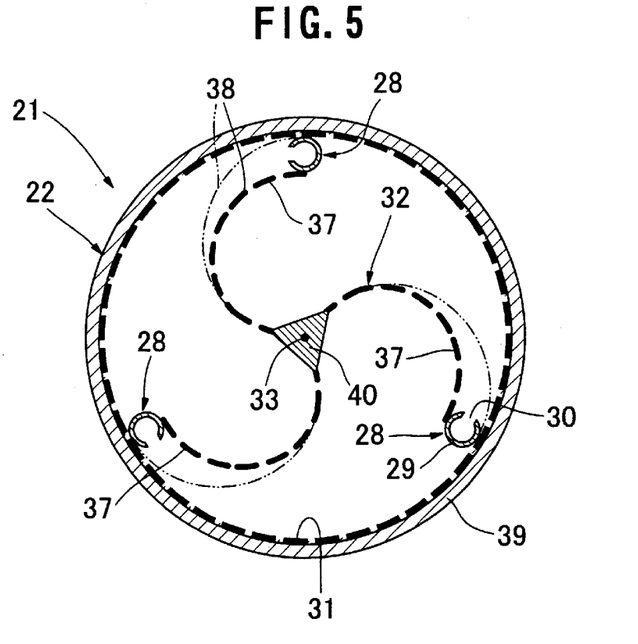
FIG. 5 is a sectional view showing another example of the accumulator according to the embodiment of the present invention.
Figure 6:
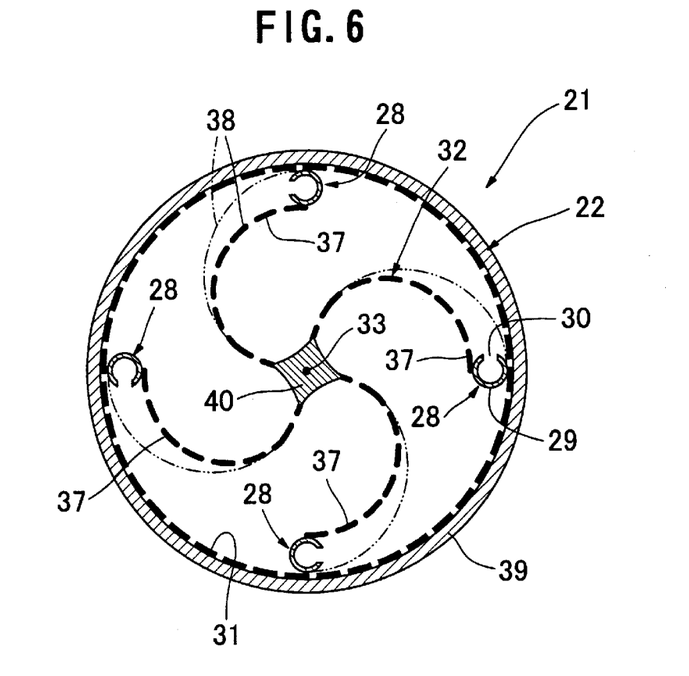
FIG. 6 is a sectional view showing still another example of the accumulator according to the embodiment of the present invention.

As shown in FIG. 5 or 6, the vane 32 may be provided in a plural number (three vanes in FIG. 5 and four vanes in FIG. 6), and each of the vanes may extends radially about the central axis 33. In this case, the connection port 28 may be provided between each of the lower ends 37 of the vanes 32 and the wick 31 so as to provide increased flow-out amount of the liquid-phase refrigerant from the accumulator 21 to the controlled unit. Preferably, the vanes 32 include a crossing portion 40 therebetween which is formed in an approximately triangular-prism shape (see FIG. 5) or an approximately quadratic-prism shape having concavely curved peripheral walls (see FIG. 6), and the crossing portion 40 has a surface smoothly connected to the vanes. In this case, the condensed liquid-phase refrigerant can flow more smoothly along the vanes 32 and the crossing portion 40.

The shape of the aforementioned vane 32 is not limited to the wave shape, and any other suitable shape having the ends 35 in contact with the inner surface of the pressure vessel 22, such as a convoluted or turbinate shape, may be applied.

The accumulator 21 according to the embodiment of the present invention can be used as a liquid tank for spacecrafts. Further, the accumulator 21 according to the embodiment of the present invention is not limited to one used for spacecrafts, but may be used as a usual tank on the ground or a thermally-controlled pressure regulator. In this case, the vane 32 having the shape in contact with the inner surface of the pressure vessel 22 provides enhanced heat transmission performance from outside into the vessel.

As described above, according to the present invention, the end of a vane has a shape in contact with the inner surface of a pressure vessel. Thus, refrigerant in liquid phase is concentrated in a space between the end of the vane and the inner surface of the pressure vessel. This provides constant gas-liquid interface, stabilized supply of the liquid-phase refrigerant to a controlled unit, and improved controllability of the controlled unit. Further, the liquid-phase refrigerant held by the vane is concentrated around the outer periphery of the pressure vessel. Thus, the liquid-phase gets close to a heater to provide improved controllability.

Further, the surface area for each vane can be enlarged. Thus, the vane can hold larger amount of refrigerant, and the inner space of the pressure vessel can be more effectively utilized. This provides various excellent effects of achieving desired downsizing and weight reduction of an accumulator and others.

What is claimed is:

1. An accumulator for evaporating and condensing a refrigerant in a pressure vessel thereof to control pressure or the like in a closed-loop type controlled unit, said accumulator comprising:

liquid-phase refrigerant holding means for holding the refrigerant in liquid phase;

heating means for heating and evaporating the refrigerant in liquid-phase;

cooling means for cooling and condensing the refrigerant in vapor-phase; and a connection port in fluid communication with said controlled unit, wherein said liquid-phase refrigerant holding means includes a vane made of a material capable of absorbing the refrigerant in liquid phase, and the end of said vane has a shape in contact with the inner surface of said pressure vessel.

2. An accumulator according to claim 1, wherein said vane is formed in a wave shape.

3. An accumulator according to claim 1, wherein said connection port is disposed between the inner surface of said pressure vessel and the end of said vane.

4. An accumulator according to claim 3, wherein said connection port includes a slit facing to a space between the inner surface of said pressure vessel and the end of said vane to allow the refrigerant in liquid phase to flow in and out through said slit.

5. An accumulator according to claim 1, wherein said liquid-phase refrigerant holding means includes a wick provided on the inner surface of said pressure vessel, said wick being made of a material capable of absorbing the refrigerant in liquid phase.

6. An accumulator according to claim 5, wherein said vane is formed in a wave shape, and wherein said wave-shaped vane is provided in a plural number, wherein said connection port is provided in the space between each of said plurality of vanes and the inner surface of said pressure vessel.

7. An accumulator according to claim 6, wherein said plurality of wave-shaped vanes include a crossing portion therebetween, said crossing portion having a surface smoothly connected to each of said vanes.

* * * * *